D. D. WILLIAMSON.
Improvement in Wheels for Traction Engines.
No. 124,186.                                Patented Feb. 27, 1872.
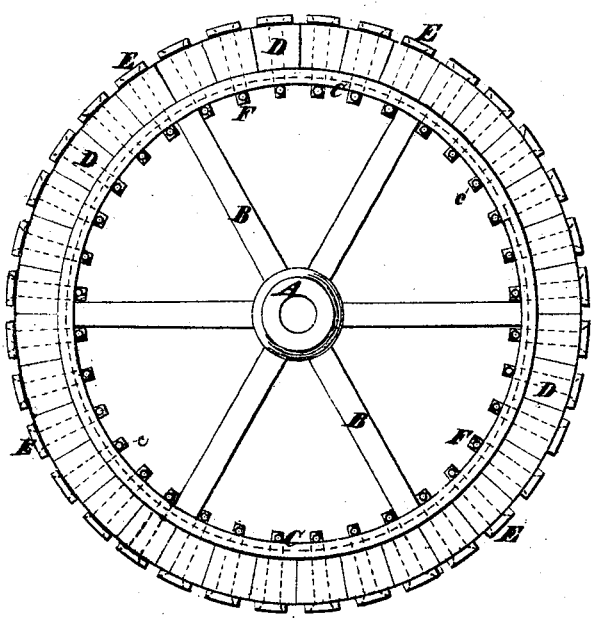
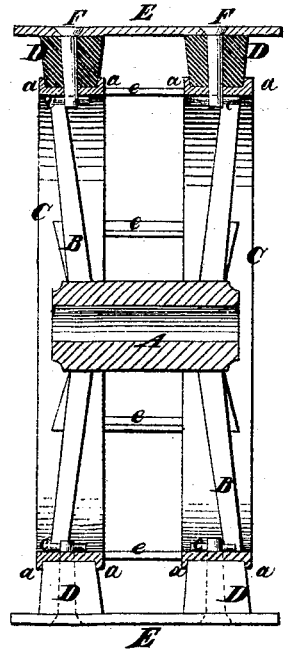

UNITED STATES PATENT OFFICE.

DOUW D. WILLIAMSON, OF NEW YORK, N. Y.

IMPROVEMENT IN WHEELS FOR TRACTION-ENGINES.

Specification forming part of Letters Patent No. 124,186, dated February 27, 1872.

Specification describing a Wheel for Traction-Engines, invented by DOUW D. WILLIAMSON, of the city, county, and State of New York.

The object of this invention is to provide wheels for traction-engines or self-moving carriages, which, in addition to possessing all the advantages of a continuous rubber tire protected by metal armor, shall be cheaper, lighter, more durable, and shall have greater adhesion. To this end it consists in the novel construction of a wheel having a metal felly or fellies and a series of rubber springs protected by metal tread-plates or shoes so secured as to admit of the compression of said springs.

In the accompanying drawing, Figure 1 is a side view of a wheel made according to my invention. Fig. 2 is a diametrical section of the same.

Similar letters of reference indicate corresponding parts in all the figures.

A is the hub, which is of cast-iron, and B B are the spokes, which are made of wrought-iron. C C are two bearing-rings or fellies, which are also of iron, and have flanges $a$ $a$ on their edges, which project about half an inch from their outer peripheries. These fellies are each about four inches wide between the flanges, and they are provided with occasional intermediate braces $e$ $e$ for the purpose of keeping them at the proper distance apart. These, however, may in some cases be omitted. D D are the vulcanized-rubber springs. They are about four and a half inches thick, four inches wide, and four inches long. They have central holes of about one inch diameter passing longitudinally through them. They are arranged side by side around each of the fellies, between the flanges, so as to form two continuous sectional rings. E E are the tread-plates or shoes, which may be of metal or wood, and are of rectangular form, about twenty inches long and three inches wide, and extend across the two series or rings of springs. F F are the bolts by which the springs and shoes are secured to the fellies. They are about one inch in diameter, and have taper heads, which are countersunk into the shoes E E, and their shanks pass through the shoes and through the springs D D and fellies C C. Their ends project beyond the latter, and are secured by pins or cotters $c$ $c$ passing transversely through them.

When in operation, the weight of the steamer compresses those springs which are on the under side of the wheel, and the bolts recede, thereby bringing a large number of the shoes in contact with the ground, and obtaining sufficient adhesion or hold for the drivers, and also a bearing for the steamer on soft ground. The action of these springs also serves to preserve the machinery. As the wheel revolves, the elasticity of the springs causes them to resume their shape as soon as they are out of contact with the ground. The flanges on the wheels prevent any lateral movement of the springs. By having two bearing-rings and corresponding series of springs, with an intermediate open space between the rubber rims and their connecting-shoes, mud and earth which may pass between the shoes free themselves and drop out, and consequently all danger of clogging the springs so as to prevent their action is obviated; and this open space also materially lessens the amount of rubber required, and renders the wheel lighter and much more elastic, in addition to lessening its cost. In case of accident to one of the springs, it can be renewed at a very slight expense.

When the steamer having these wheels applied is to be used on soft ground, the shoes or tread-plates may be longer than described, for the purpose of increasing the bearing-surface and preventing the wheels from indenting themselves into the ground. They can also be fitted with spurs or paddles for running on ice or very slippery earth.

These wheels are very durable, as they have no armor or other parts liable to be broken, and as there can be no possible slip between the springs and fellies they are reliable under a heavy strain.

*Claims.*

1. A wheel for traction-engines or self-moving carriages, having its springs arranged on double fellies, with space between them, forming openings through the central portion of the tread of the wheel, substantially as and for the purpose herein specified.

2. The combination of the iron rims, the rubber springs, and shoes or tread-plates, substantially as and for the purpose herein set forth.

3. The combination of the bolts F F, shoes E E, and springs D D with the fellies C C, substantially as and for the purpose herein set forth.

D. D. WILLIAMSON.

Witnesses:
FRED. HAYNES,
FERD. TUSCH.